United States Patent [19]

Serwatka

[11] Patent Number: 5,196,899

[45] Date of Patent: Mar. 23, 1993

[54] FIBER OPTIC TEST LIGHT WITH MULTIPLE CONNECTOR ADAPTERS

[76] Inventor: Robert Serwatka, 1703 Rock Fence, Richmond, Tex. 77469

[21] Appl. No.: 733,157

[22] Filed: Jul. 19, 1991

[51] Int. Cl.⁵ .................. G01N 21/88; G01N 21/59; G02B 6/42
[52] U.S. Cl. .................. 356/73.1; 385/134
[58] Field of Search .............. 356/73.1; 385/88, 89, 385/134

[56] References Cited

U.S. PATENT DOCUMENTS

| | | | |
|---|---|---|---|
| 3,884,585 | 5/1975 | Lebduska | 356/73.1 X |
| 4,671,629 | 6/1987 | Doyle | 356/73.1 X |
| 4,834,486 | 5/1989 | Walker | 385/134 |
| 4,940,892 | 7/1990 | Fisher et al. | 356/73.1 X |

FOREIGN PATENT DOCUMENTS 57-6333  1/1982  Japan ................... 356/73.1

*Primary Examiner*—Vincent P. McGraw
*Attorney, Agent, or Firm*—Bernard A. Reiter; Umesh M. Desai

[57] ABSTRACT

An apparatus which provides a quick, simple visual continuity testing of fiber optic cables, patch cords, pig tails and the like; and wherein the invention comprises a light source, an adaptive interface, a power source, and a housing within said components are located; the invention provides an adaptive interface with the ability to match or connect various fiber optic connectorized endings and also bare fiber to a light source, thus permitting visual testing for the continuity and integrity of a fiber optic link.

2 Claims, 4 Drawing Sheets

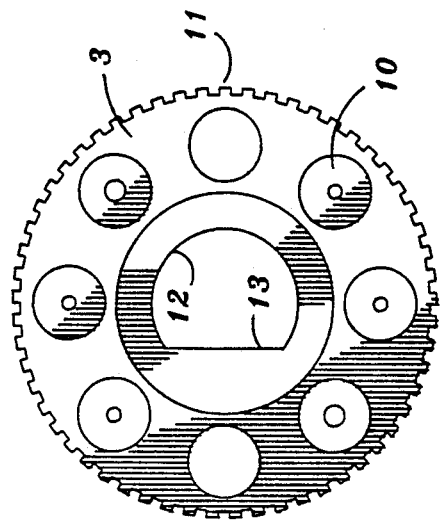
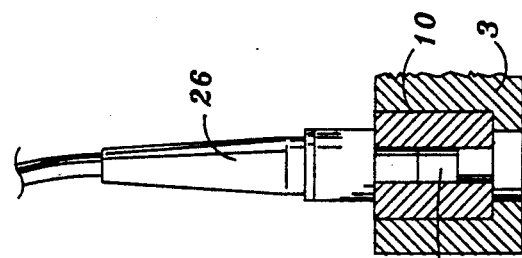
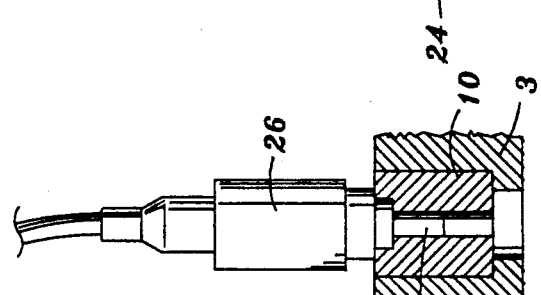
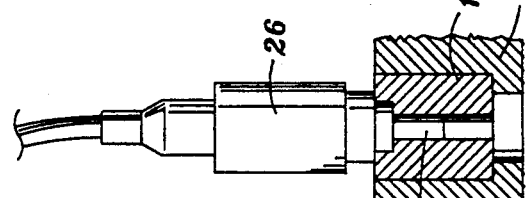
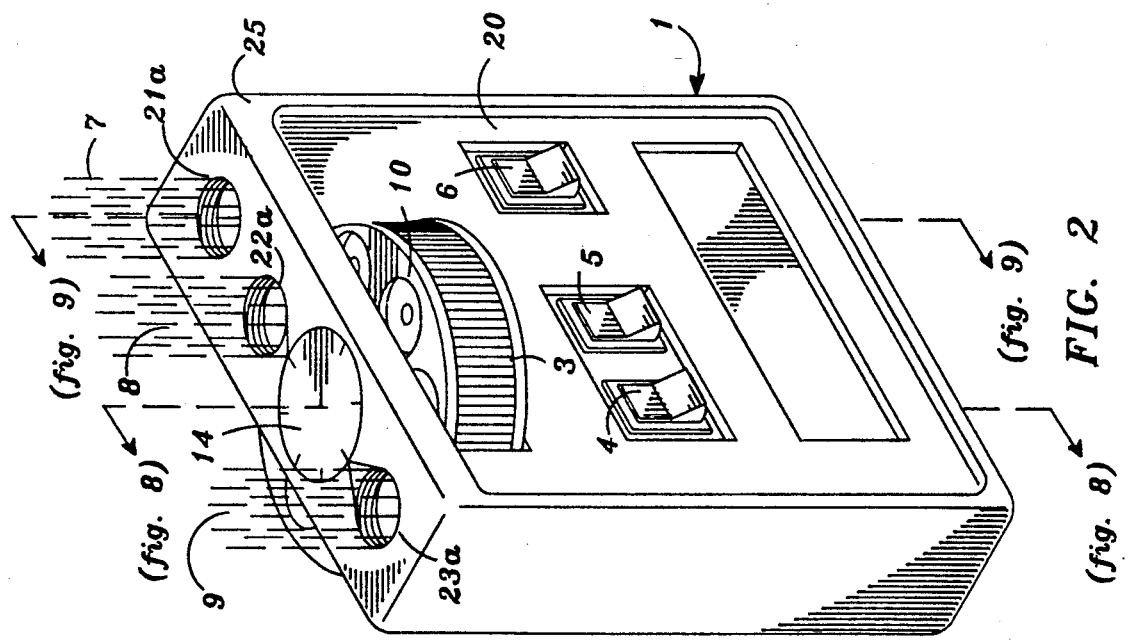

FIBER OPTIC TEST LIGHT WITH MULTIPLE CONNECTOR ADAPTERS

BACKGROUND OF THE INVENTION

1. Field of the Invention

The present invention provides a quick, simple visual continuity testing of fiber optic cables, patch cords, and pigtails (terminated or otherwise). The device serves as a tool for visually testing the continuity of fiber, connector performance, spliced areas, and area of high attenuation. The device may also serve as a visual fault locator and fiber identifier. The invention provides an adaptive interface with the ability to match or connect various fiber optic connector ends and bear fiber ends to a light source, thus permitting a choice of fiber cables to be tested. The invention also provides a multiple light source for testing several fiber cables simultaneously. The invention would have application where the integrity of a fiber optic link is suspect and a visual test would assist a technician in the trouble shooting assessment or allay the concerns of the skeptical/non-technically oriented customer.

2. Prior Art

The simple schematic diagram shown in FIG. 1 consists of an optical transmitter and receiver connected by a length of optical cable in a point-to-point link. The optical transmitter converts electronic signal voltage into optical power which is launched into the fiber by a light emitting diode (LED), laser diode (LD) or laser. At the photo detector point, either a positive-intrinsic-negative (PIN) or avalanche photo diode (APD) capture the light wave pulses for conversion back into electrical current.

A fiber optics link is generally composed of a number of basic components:
 a. electro-optical signal transducer-transmitter.
 b. optical fiber cable.
 c. optical-electrical signal transducer, the receiver.
Depending on the particular requirements of the system, the link may also include:
 a. demountable connectors; transmitter-to-fiber, fiber-to-fiber, fiber-to-receiver.
 b. branching couplers—for multiple access systems.

The first concern in the design of a fiber optic link is the signal quality. Link design consists basically of two functions: (1) the measure of optical power losses occurring between the light source and the photo detector, and (2) determining band width limitations on data carrying abilities imposed by the transmitter, fiber, and the receiver. If the source emits sufficient power and the receiver is sensitive enough, the system can operate with high losses. How much loss can be tolerated will be determined by the stated minimum requirements of the receiver selected.

The prime causes of optical attenuation in fiber systems are: coupling loss, optical fiber loss, connector loss, and splice loss. In order to minimize power losses, the fiber optic industry has devised a number of devices used to measure power losses through cable connectors and the such.

Optical reflectometry is an advanced technique which allows the optical characteristics of a fiber to a measured given access to just one end. Such equipment launches a short, but extremely powerful pulse of light into the fiber, and then detects the minute returning echo caused by reflections from discontinuities such as breaks within the fiber. By measuring the time interval between the transmitted pulse and the returning echo, the position of major discontinuities can be established to within an accuracy of one or two meters. This extremely sensitive equipment can detect fractures at considerable distances and is even capable of detecting much smaller reflection caused by continuous back scatter along the fiber. Typically, the degree of this back scatter is constant but an exponential decay is observed at the receiver as a result of the attenuation caused by intermediate lengths of fiber. By measuring the rate of this decay, it is possible to make quite reasonable estimates of fiber attenuation, and in particular observe any local increase caused by a severe bend, etc. Alternatively, a hard copy "finger print" of a fiber can be obtained from a chart recorder and used for comparison at a later date (for example, after environmental conditioning).

The sensitivity of this equipment will be appreciated when it is realized that the returning reflection (which is only a maximum of 4% of the incident light, even for a clean fracture) is further attenuated by effectively traveling through the fiber twice (i.e., there and back). Consequently, special techniques have evolved to extract the signal from beneath the level of the background noise.

These optical fiber reflectometers therefore consist of sophisticated computer programmed and programmable features and benefits. They require a trained technician and a sophisticated knowledge of fiber optic technology Further, these types of equipment are extremely expensive.

Other aids devised by the industry to measure losses or attenuation include a Power Meter with or without an optical energy source, and a Visual Fault Locator. The Power Meter reads the source power whether it is transmitted from the transmitting end or artificially supplied. The Visual Fault Locator (VFL) provides a laser source as the optical energy source. It is also very expensive. In addition, the VFL has the additional disadvantage of requiring the operator to view the laser output, causing concern of retinal damage.

As can be seen from the description the current technology on the market the principal of light transmission through optical fibers is highly sophisticated and technical requiring trained personnel. The draw-backs inherent in the current technology on the market include the requirement of expensive equipment to test and trouble-shoot fiber optic linkages. Because of the lack of trained technicians, there is a critical need for a versatile, inexpensive, simple device which has the ability to test the continuity of the majority of optical fibers presently in use today. The present invention fills this need most adequately and appropriately. The present invention can quickly and easily without a doubt visually determine the integrity of a fiber optic link. This inexpensive device encourages the use of current and present technology in trouble-shooting and testing fiber optic links by untrained or newly trained personnel without having to go through expensive and rigorous training.

SUMMARY OF THE INVENTION

The present invention emits optical energy, and is intended to be used to test the integrity of a fiber optic link in a general manner. The purpose of the present invention is to test in a quick and easy manner, whether optical energy is being received at the other (receiving) end. The receiving end does not need any measuring equipment but simply requires visual detection by the human eye. The present invention therefore tests simply whether a fiber optic cable is structurally intact or whole.

The present invention does not measure minor attenuation, but rather is a means to test to see if the fiber optic cable is structurally sound. The device, however, does provide the opportunity to detect high attenuation that results from loss of light energy at certain points in the link. In addition, the device tests for continuity, connector performance and spliced areas. Other prior art devices in the market offer more sophistication by precisely measuring the attenuation and its location. Such types of equipment, however, are bulky, difficult to use, and require considerable skill to operate them. Also they are expensive to manufacture. The present invention, on the other hand, provides the first step in the testing of fiber optic cables. It quickly puts the technician on notice of the integrity of a certain fiber optic cable. Thus, the present invention would have any application where integrity of a fiber optic link is suspect, and a visual test would assist a technician in his or her trouble-shooting assessment.

BRIEF DESCRIPTION OF THE DRAWINGS

Referring to the accompanying drawings, which are for illustrative purposes—

FIG. 2 illustrates a perspective view of the fiber optic test light with multiple connector adapters.

FIG. 3 represents the cross-sectional view of the adaptive interface consisting of a wheel with diametrically opposed connector end fittings.

FIGS. 4 through 6 represent various types of connector endings as inserted in the adaptive interface.

DETAILED DESCRIPTION OF THE PREFERRED EMBODIMENT

Figure 1:
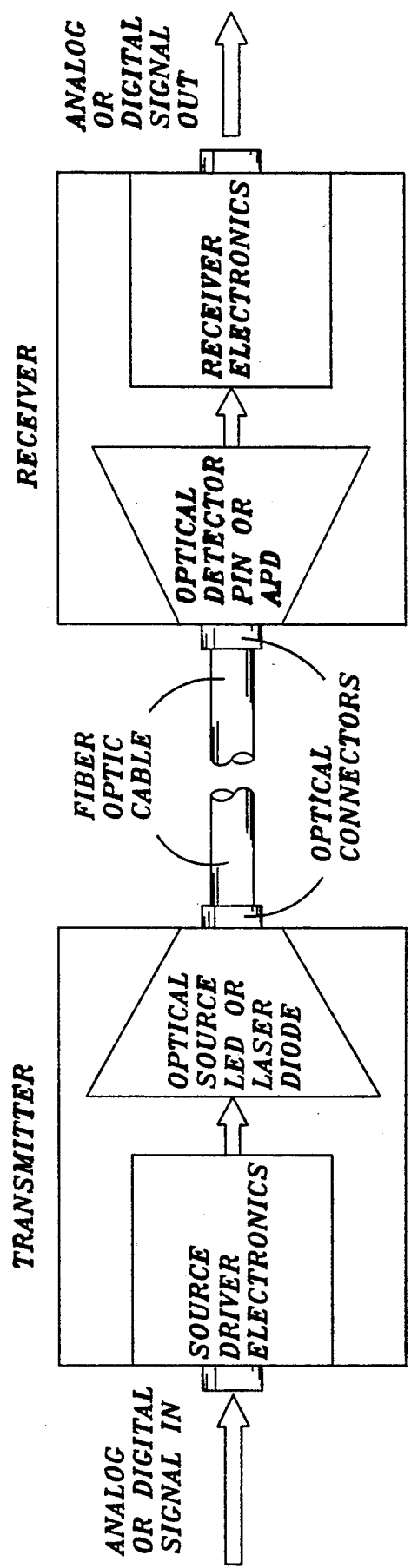
FIG. 1 represents a schematic diagram of a simple fiber optic link (prior art).

The manner in which the fiber optic test light functions for its purpose may be readily understood by reference to the diagrams.

FIG. 2 shows a perspective view of the fiber optic test light 1. The face 20 of the unit shows a wheel 3, and three light switches 4, 5 and 6 controlling the three light sources 7, 8 and 9 respectively. For example, light switch 4 controls light source 9. Light switch 5 controls light source 8. Light switch 6 controls light source 7. Each of the switches 4, 5 and 6 is operated independently, and therefore, all three light sources 7, 8 and 9 may be used or a combination of any of the three.

FIG. 3 represents and shows the cross-sectional view of the wheel 3 having a variety of connector end fittings 10. The grooved circumference 11 of the wheel 3 is provided for easy handling and is used to selectively turn the wheel 3 to the appropriate connector end fitting 10. The same connector end fittings 10 may be placed on the wheel 3 in diametrically opposed directions, so that during any single selection, the same two connector end fittings 10 are in the direct path of the light source 7, 8 or 9. The center bare 12 of the wheel 3 is notched 13 to align with the center pin 14 upon assembly and mounting of the wheel 3 to the housing 25. (See FIGS. 7-9.)

FIGS. 4 through 6 represent and show a linkage 26 with the various connector endings inserted in the connector fittings 10 on the wheel 3. The three examples represent some common different connector ends 24 of various sizes.

Figure 8:
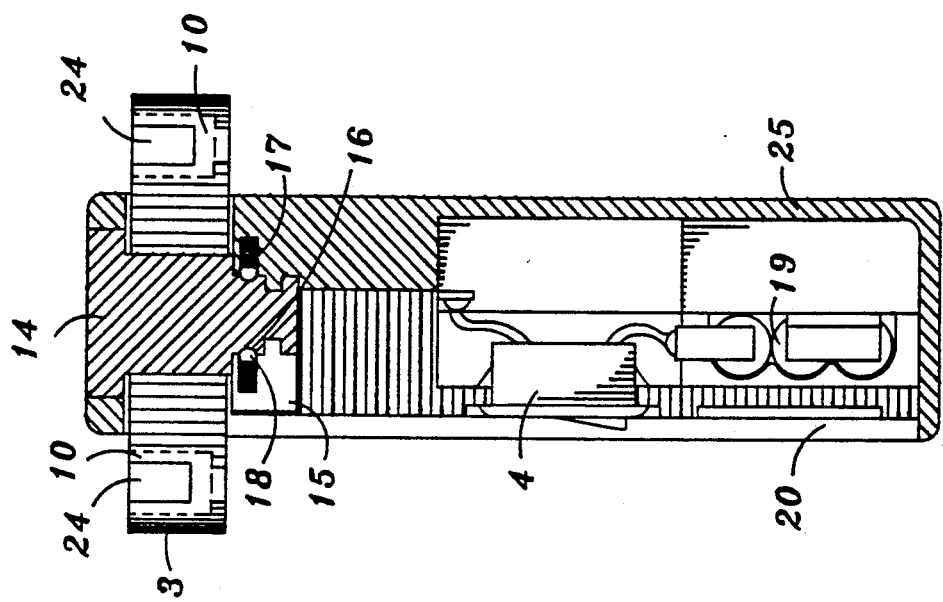
FIG. 8 represents the cross-sectional view of the housing unit through the center plane displaying the mechanism for holding the wheel in place.
Figure 7A:
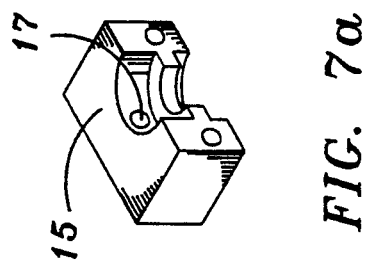
FIG. 7a represents the perspective view of the bracket used to mount the center pin which holds the adaptive interface wheel.
Figure 7:
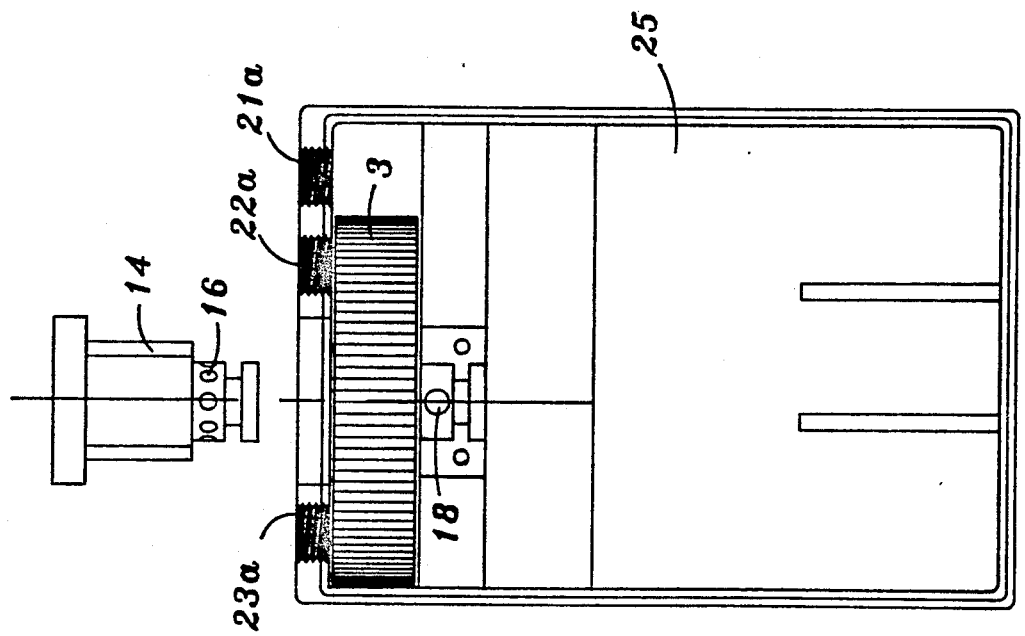
FIG. 7 represents the plan view of the cover of the housing unit.

FIGS. 7, 7a, and 8 show the assembly of the wheel 3 by insertion of a center pin 14 into the notched center bare 12 in the wheel 3 and the bracket fitting 15 locking the wheel 3 to the housing 25. As the center pin 14 is inserted into the notch 13 of the center bare 12, the notch 13 binds the center pin 14 and the wheel 3. The center pin 14 is then mounted onto the bracket fitting 15 to securely hold the center pin 14 and the wheel 3 in place. The center pin 14 has indentations 16 to selectively hold in place the wheel 3 at the appropriate connector end fitting 10 in direct path of the light source 7, 7a, 8 or 9. The indentation 16 holds the center pin 14 and mounted wheel 3 in place with a spring 17 and ball 18 combination as shown in FIGS. 7, 7a and 8. This ball 18 and spring 17 combination securely holds into position the mounted wheel 3 and the center pin 14 until selectively changed to another position.

FIG. 8 represents a cross-sectional view through the center plane of the bracket fitting 15 on the center pin 14. The spring 17 and ball 18 combination is clearly shown in cross-section in FIG. 8. The spring 17 pushes upon the ball 18 which in turn lodges within the indentation 16 on the center pin 14. This ball 18 and spring 17 combination prevents the wheel 3 from arbitrarily turning to another connector end fitting 10, and also further prevents the connector end fitting 10 from becoming misaligned from the direct path of the light source 7, 8 and 9. FIG. 8 also shows the battery power 19 for the light source 7, 8 and 9 and the cross-sectional view of the light switch 4.

Figure 10:
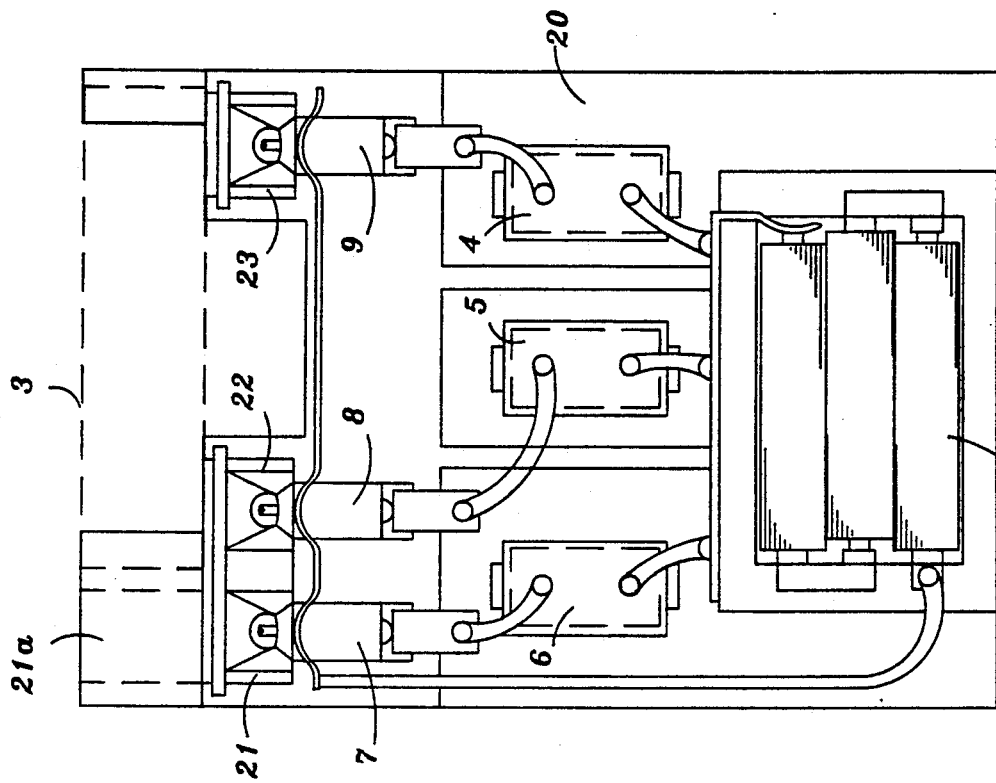
FIG. 10 represents the plan view of the bottom tray housing the individual electrical components of the testing unit.
Figure 9:
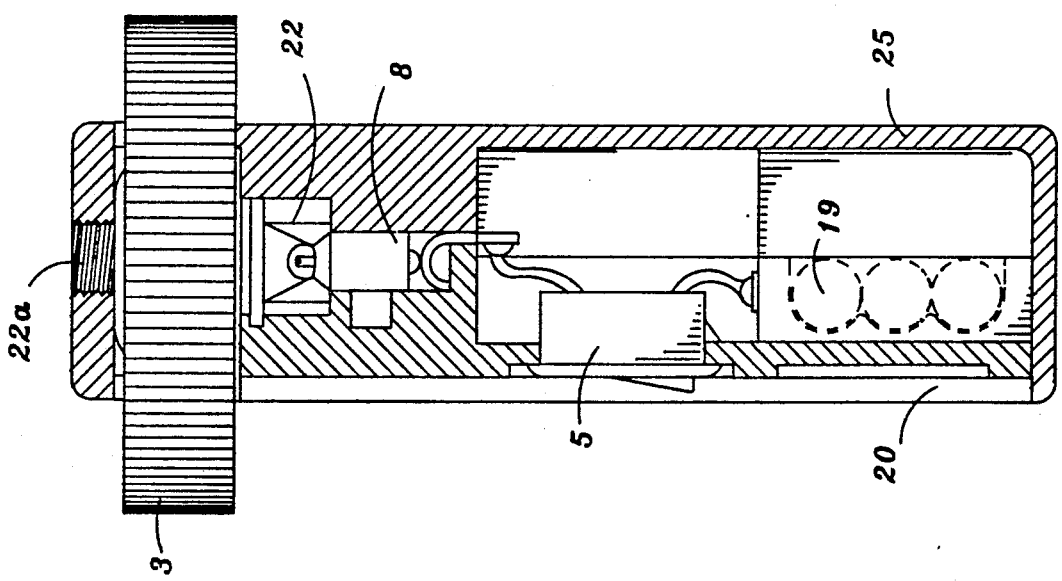
FIG. 9 represents the cross-sectional view of the housing unit displaying the light source, the power source and the switch.

FIGS. 9 and 10 shows the cross-sectional view of the light source 7, 8 and 9 in direct path of the connector end fitting 10 on the wheel 3. As the wheel 3 is turned, a new connector end fitting 10 moves into place in the direct path of the light source 7, 8 and 9. Since the light source 7, 8 and 9 and the connector end fitting 10 are in direct alignment, the light energy is transmitted through the fiber optic cable, and which may be visually inspected at the receiving end.

FIG. 10 represents and shows the plan view of the bottom tray 20 in which various electrical components are located. This plan view shows the three light sources 7, 8 and 9 in direct alignment with the three openings 21, 22 and 23 and 21a, 22a, and 23a, respectively in the housing unit 25 through which the optical energy travels and converges with the fiber connector ends 24 when they are inserted in the wheel 3. Light source 8 and 9 are aligned with the adaptive interface means on the wheel S. Light source 7 is aligned with the opening 21 wherein a bare fiber end may inserted. The three light switches 4, 5 and 6, controlling the three light sources 7, 8 and 9 respectively can be used in any combination. This independent switching action provides the advantage of identifying various cables in a fiber bundle.

From the foregoing description and drawings, it will be clearly evident that delineated objects and features of the invention will be accomplished.

Various modifications may suggest themselves to those skilled in the art without departing from the spirit of the invention and, hence, the inventor does not wish to be restricted to the specific forms shown or uses mentioned, except to the extent indicated in the appended claims. For example, the adaptive interface wheel may have many variations and is not intended to be limited to those described herein. Similarly, the number or type of light sources may be variable. The power source may also be varied to include an A.C. electrical power source rather than a D.C. power source.

What is claimed is:

1. An apparatus for testing optical fiber continuity and integrity in a fiber optic linkage comprising:
   (a) a housing;
   (b) a plurality of optical energy source means located within said housing for providing multiple light sources;
   (c) a bare fiber interface means located within said housing for holding a bare fiber optic end in the direct path of at least one of said multiple light sources;
   (d) an adaptive interface means located within said housing for interchangeably holding at least one of a variety of optical fiber connectorized ends in the direct path of at least one of said multiple light sources;
   (e) said adaptive interface means comprises a wheel having a variety of fiber optic connectorized end fittings;
   (f) said wheel mounted within said housing for selectively turning said wheel to place an appropriate fiber optic connectorized end fitting in said direct path of at least one of said multiple light sources;
   (g) said adaptive interface means and said bare fiber interface means being located separately and distinctively within said housing; and
   (h) a plurality of switches located within said housing to control each of said optical energy source means independently.

2. An apparatus for testing the integrity and continuity of optical fibers in a fiber optic linkage comprising:
   (a) a housing;
   (b) an optical energy source means located within said housing for providing an optical light source;
   (c) an adaptive interface means located within said housing for holding an optical fiber connectorized end in the direct path of said optical light source;
   (d) said adaptive interface means comprises a wheel having a variety of fiber optic connectorized end fittings;
   (e) said wheel mounted within said housing for selectively turning said wheel to place an appropriate said fiber optic connectorized end fitting in said direct path of said optical light source; and
   (f) a switch located within said housing to control said optical energy source means.

* * * * *